United States Patent [19]
Heaton

[11] Patent Number: 5,216,726
[45] Date of Patent: Jun. 1, 1993

[54] DATA COMPRESSION PROCESS

[75] Inventor: Robert J. Heaton, San Jose, Calif.

[73] Assignee: United Silicon Structures, Inc., San Jose, Calif.

[21] Appl. No.: 497,659

[22] Filed: Mar. 23, 1990

[51] Int. Cl.$^5$ ............................................. G06K 9/00
[52] U.S. Cl. ........................................ 382/56; 382/23
[58] Field of Search ...................... 382/56, 16, 22, 23; 358/426, 261.3, 432

[56] References Cited

U.S. PATENT DOCUMENTS

| | | | |
|---|---|---|---|
| 4,718,105 | 1/1988 | Lipkie et al. | 382/25 |
| 4,783,829 | 11/1988 | Miyakawa | 382/56 |
| 4,847,911 | 7/1989 | Morimoto et al. | 382/22 |
| 4,853,971 | 8/1989 | Nonura | 382/56 |

*Primary Examiner*—Leo H. Boudreau
*Attorney, Agent, or Firm*—Burns, Doane, Swecker & Mathis

[57] ABSTRACT

A process for compressing data describing the layout of integrated circuits so that the layout information can be readily communicated over conventional telephone lines at substantially increased speeds and, hence, at substantially reduced cost. As applied to integrated circuits that have been designed with computer-aided design (CAD) methods, the process includes the steps of assigning unique tokens to describe selected geometrical attributes of sets of polygonal shapes, which tokens ordinarily are less than a single byte of binary information. For example, a token can be used to signify that the x-direction coordinates of a second polygon are all spaced from respective ones of the x-direction coordinates of a first polygon by the given distance.

7 Claims, 2 Drawing Sheets

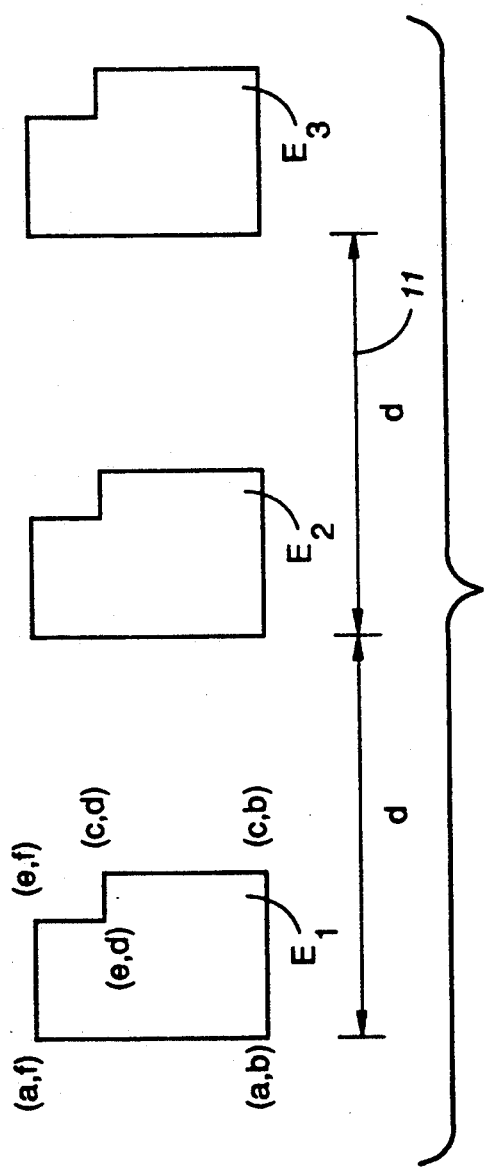
FIG._1
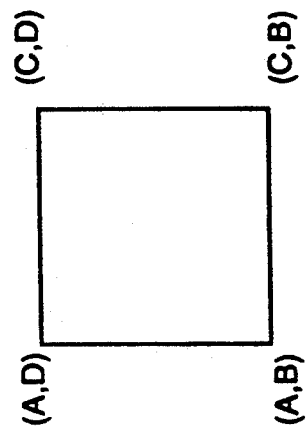
FIG._2

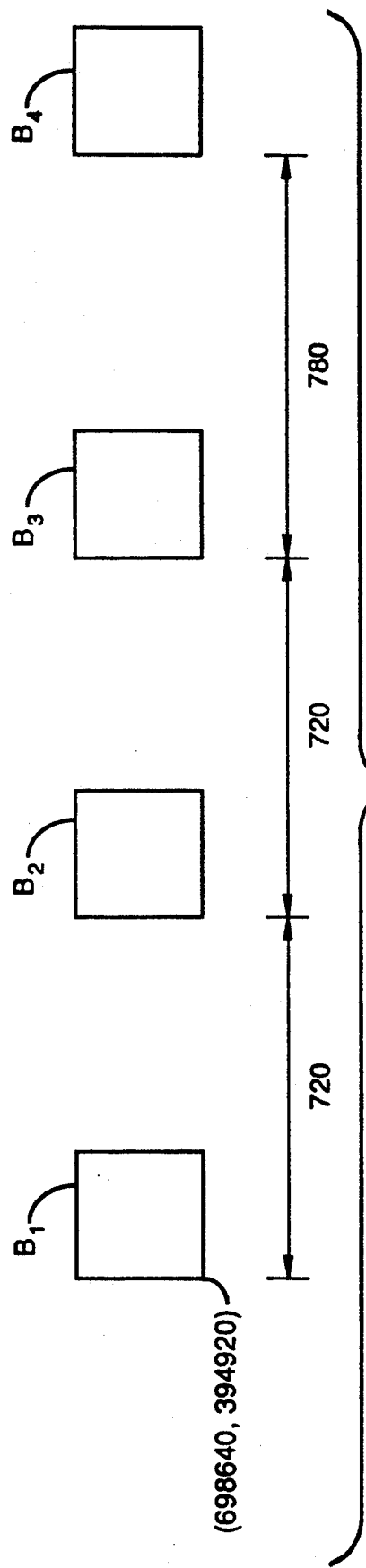
FIG._3
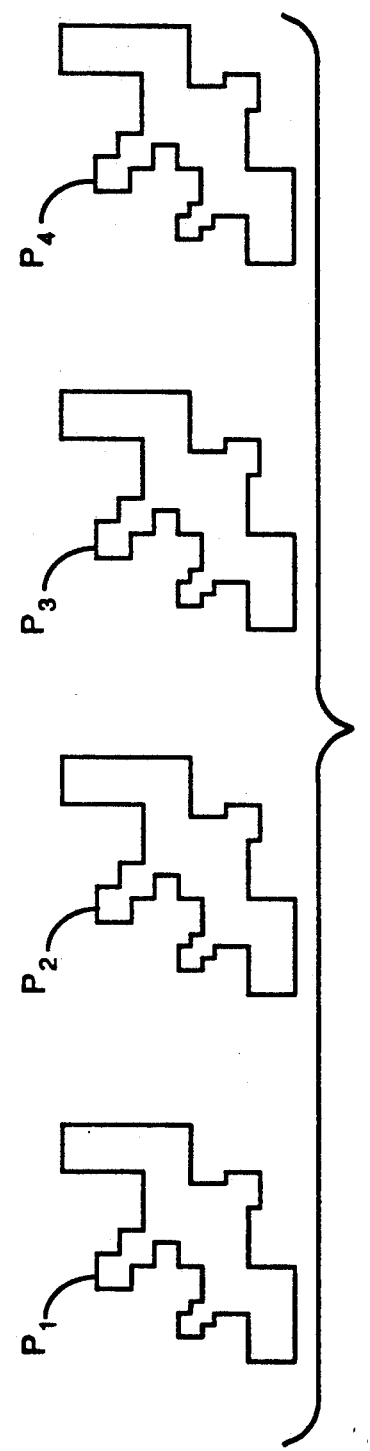
FIG._4

DATA COMPRESSION PROCESS

BACKGROUND OF THE INVENTION

1. Field of the Invention

The present invention generally relates to processes for compressing geometrical data and, more particularly, to processes for compressing data relating to geometrical structures such as layouts of integrated circuits.

2. State of the Art

Modern integrated circuits, including application-specific integrated circuits of the LSI (large scale integration) or VLSI (very large scale integration) class, normally are comprised of many thousands of individual functional blocks. For instance, functional blocks in integrated circuits may comprise random access memories (RAMs), read-only memories (ROMs), or arithmetic logic units (ALUs). Also, functional blocks may be as simple as individual logic gates.

It is well known that computer-aided design (CAD) tools can be used for designing application-specific integrated circuits (ASICs). When designing and fabricating such circuits, information must be provided as to the layouts of the circuits. In practice, layouts of integrated circuits can comprise arrays of millions of polygonal shapes. The locations of individual polygonal shapes within the layouts are customarily described by specifying the locations of the vertices of the polygons. Because a high degree of precision is required when describing layouts of integrated circuits, the coordinates of the vertices of the polygonal shapes must each have a relatively large number of significant digits. Thus, in ordinary practice, very large quantities of numeric information are required to describe layouts of large integrated circuits.

Although layout information for integrated circuits can be manipulated quickly by modern computers such as engineering work stations, the communication of layout information from on location to another through normal telecommunication channels is slow and costly. For example, communication of the layout of a typical VLSI circuit over conventional telephone lines (i.e., via a modem) can take many hours. Accordingly, there exists a need for a process for compressing data describing the layout of integrated circuits so that the layout information can be readily communicated over conventional telephone lines at substantially increased speeds and, hence, at substantially reduced cost.

SUMMARY OF THE INVENTION

The data compression techniques of the present invention are normally applied to integrated circuits, particularly ASIC circuits, that have been designed with computer-aided design (CAD) methods.

The first data compression technique according to the present invention is premised upon the fact that, in most integrated circuits that have been designed with computer-aided design (CAD) methods, the circuits are comprised of arrays of similar polygonal shapes having the same orientation. Thus, as applied to integrated circuits that have been designed with computer-aided design (CAD) methods, the process according to the present invention includes the steps of assigning unique tokens to describe selected geometrical attributes of sets of polygonal shapes, which tokens ordinarily are less than a single byte of binary information. For example, a token can be used to signify that the x-direction coordinates of a second polygon are all spaced from respective ones of the x-direction coordinates of a first polygon by the given distance.

BRIEF DESCRIPTION OF THE DRAWINGS

The present invention can be further understood by reference to the following description and the appended drawings which illustrate the preferred embodiments of the invention. In the drawings:

FIG. 1 provides an example of a layout that includes several repetitive polygonal shapes with identical orientations and equal spacing;

FIG. 2 provides an example of a layout that includes a polygon having several redundant coordinates;

FIG. 3 provides an example of a layout that includes several repetitive box-like shapes with identical orientations but unequal spacing; and FIG. 4 provides an example of a layout that includes several complex polygonal shapes with identical orientations but unequal spacing.

DETAILED DESCRIPTION OF THE PREFERRED EMBODIMENTS OF THE INVENTION

In FIG. 1, an irregular polygonal shape $E_1$ has six vertices. If the six vertices were described by their respective cartesian coordinates, six sets of numbers (x,y) would be required. (The number "x" in each set normally designates the x-direction coordinate of a vertex, and the number "y" designates the y-direction coordinate of a vertex.) For purposes of discussion, the six vertices of polygon $E_1$ are designated, respectively, as (a,b), (c,a), (c,d), (e,d), (e,f), and (a,f). Typically, each of the numbers "a" through "f" usually have six or more significant digits.

As mentioned above, a typical layout of an integrated circuit can contain millions of polygonal shapes such as shown in FIG. 1. Accordingly, a very large quantity of information is required t communicate the layout information from one location to another through normal telecommunication channels. The following will describe techniques for compression, or abbreviation, of the layout data in a manner that reduces the time and expense of data transmission.

A first data compression technique is premised upon the observation that layouts of most integrated circuits comprise arrays of repetitive similar shapes having the same orientation. Thus, by way of example, FIG. 1 shows three polygonal shapes $E_1$, $E_2$, and $E_3$ that each have the same shape and orientation at equal locations along a base line 11. If the array of those three polygonal shapes were described using conventional cartesian coordinates, the description would require thirty-six numbers (i.e., eighteen couplets of numbers) where the circuit had only a single layer.

Compression of placement information for the polygonal shapes in FIG. 1 can be achieved by assigning "tokens" to describe selected geometrical attributes of the polygons, where each token comprises less than a single byte of binary information. As a specific example, a token such as the symbol "{" followed by the number "d" (i.e., "{d") could be used to signify that the x-direction coordinates of the second polygon $E_2$ are all spaced from respective ones of the x-direction coordinates of the first polygon by the given distance "d". Given that the coordinates of the vertices are each expressed as an ordered set, the same token "{" could be used to signify that the y-direction coordinates of the second polygon $E_2$ are equal to respective ones of the y-direction coordinates of the first polygon $E_1$.

Once it is found that there is constant x-direction displacement between corresponding ones of the vertices of the second polygon $E_2$ and the vertices of first polygon $E_1$, the location and shape of the third polygon $E_3$ relative to the second polygon $E_2$ can be described by a single token. That is, the location and shape of the third polygon $E_3$ can be described without explicitly designating the distance that separates its vertices from respective ones of the vertices of the second polygon $E_2$. Thus, the description of the layout of the third polygon $E_3$ can be compressed relative to the description of the layout of second polygon $E_2$.

A related data compression technique is premised upon the observation that polygons in integrated circuit layouts often have redundant coordinates. In other words, data compression can be achieved by eliminating coordinate redundancy.

A simplified example of coordinate redundancy is provided by FIG. 2. In that drawing, a polygon $E_4$ has a simple square shape, and the coordinates of its vertices are given by the ordered sets of numbers (A,B), (C,B) (C,D) and (A,D). In those four sets, the numbers "A," "B," "C,"0 and "D" appear twice and, hence, are redundant. The redundancy can be eliminated by introducing tokens "r" and "-" as shown in Table I below:

TABLE I

| Conventional | P | A,B | C,B | C,D | A,D; |
|---|---|---|---|---|---|
| Compressed | P | A,B | C,r | r,D, | -,r; |

In Table I, the letter P designates that polygons are described by both the conventional data and the compressed data. In the compressed description, the token "r" denotes that one of the last x-dimension or y-dimension coordinates should be repeated. Specifically, the first instance of the token "r" designates that the last x-dimension coordinate (i.e., B) should be repeated. Likewise, the second instance of the token "r" designates that the last y-dimension coordinate (i.e., C) should be repeated. Further in Table I, the token "-" denotes that the first x-dimension coordinate of the polygon should be repeated.

Yet another data compression technique is premised upon the observation that numbers that describe relative distances between vertices of polygonal shapes in integrated circuit layouts are usually substantially smaller (i.e., have fewer significant digits) than the numbers that are required to describe the distances between the vertices and a common origin point. For instance, the ordered set of numbers (698880, 395160) might be required to describe the cartesian coordinates of a vertex of a polygon relative to an origin point, while the position of that particular vertex relative to another vertex of the same polygon might be described by the ordered set of numbers such as (0, 240) having substantially fewer significant digits.

In the following, numbers that describe displacements of vertices relative to one another are called "delta" numbers. In layouts of integrated circuits, common delta numbers can frequently be found. That is, polygons are usually located at equally spaced intervals in layouts of integrated circuits. As will be explained further below, substantial data compression can be achieved by representing common delta numbers as tokens.

In conjunction with the simple rectangular boxes $B_1$ through $B_4$ shown in FIG. 3, Table II provides a more detailed example of the above-described data compression techniques. Initially, it should be noted that boxes $B_1$ through $B_4$ have identical shapes and orientations but unequal spacing.

TABLE II

| ARRAY OF BOXES BEFORE COMPRESSION |
|---|
| P 698640 394920 698640 395160 698880 395160 698880 394920; |
| P 699360 394920 699360 395160 699600 395160 699600 394920; |
| P 700080 394920 700080 395160 700320 395160 700320 394920; |
| P 700860 394920 700860 395160 701100 395160 701100 394920; |
| ARRAY OF BOXES AFTER COMPRESSION |
| P 698640 394920 & [240 [240| |
| P {720? |
| P + |
| P {780? |

In the case of the first box described in Table II, the token "&" designates that the preceding y-dimension coordinate of the polygon should be repeated. The token "[" designates the preceding x-direction coordinate of the polygon should be repeated with the quantity 240 added to it (i.e., 394920+240 =395160). Similarly, in its second occurrence, the token "[" indicates that the preceding y-dimension coordinate of the polygon should be repeated with the quantity 240 added to it (i.e., 69860+240=698880).

Further with reference to the description of the first box in Table II, the token "|" indicates that the first box is to be closed by a simple right angle corner connecting the first vertex with the last specified vertex. Thus, in this example, the x-direction coordinate of the third vertex of the first box will be understood, and the x- and y-direction coordinates of the fourth vertex will be understood to be redundant.

With reference to the description of the second box in Table II, the token "{" signifies that the x-direction coordinates of the second box are all spaced from respective ones of the x-direction coordinates of the first box by a given distance (i.e., 720 units). Finally as to the second box, the token "?" signifies that the coordinates of the second box are to be completed in the same way as the first box.

As to the third box defined by Table II, the token "+" signifies that the x- and y-direction coordinates of the vertices of the third box are related to respective ones of the coordinates of the vertices of the second box in the same manner that the x- and y-direction coordinates of the vertices of the second box are related to respective ones of the coordinates of the vertices of the first box.

In accordance with the preceding discussion and the complex polygonal shapes $P_1$ through $P_4$ shown in FIG. 4, Table 3 provides a more comprehensive example of the above-described data-compression techniques.

TABLE 3

| ARRAY OF POLYGONS BEFORE COMPRESSION |
|---|
| P 635780 746220 635780 746820 636080 746820 636080 747000 636020 747000 |
| 636020 747180 636200 747180 636200 747120 636440 747120 636440 747360 |
| 636980 747360 636980 747120 636740 747120 636740 746940 636800 746940 |
| 636800 746880 636860 746880 636860 746760 636740 |

TABLE 3-continued

```
746760 636740 746820
636680 746820 636680 746880 636440 746880 636440
746760 636320 746760
636320 746640 636440 746640 636440 746520 636560
746520 636560 746340
636380 746340 636380 746460 636260 746460 636260
746580 636020 746580
636020 746220;
p 637220 746220 637220 746820 637520 746820 637520
747000 637460 747000
637460 747180 637640 747180 637640 747120 637880
747120 637880 747360
638420 747360 638420 747120 638180 747120 638180
746940 638240 746940
638240 746880 638300 746880 638300 746760 638180
746760 638180 746820
638120 746820 638120 746880 637880 746880 637880
746760 637760 746760
637760 746640 637880 746640 637880 746520 638000
746520 638000 746340
637820 746340 637820 746460 637700 746460 637700
746580 637460 746580
637460 746220;
p 638660 746220 638660 746820 638960 746820 638960
747000 638900 747000
638900 747180 639080 747180 639080 747120 639320
747120 639320 747360
639860 747360 639860 747120 639620 747120 639620
746940 639680 746940
639680 746880 639740 746880 639740 746760 639620
746760 639620 746820
639560 746820 639560 746880 639320 746880 639320
746760 639200 746760
639200 746640 639320 746640 639320 746520 639440
746520 639440 746340
639260 746340 639260 746460 639140 746460 639140
746580 638900 746580
638900 7462320;
p 640220 746220 640220 746820 640520 746820 640520
747000 640460 747000
640460 747180 640640 747180 640640 747120 640880
747120 640880 747360
641420 747360 641420 747120 641180 747120 641180
746940 641240 746940
641240 746880 641300 746880 641300 746760 641180
746760 641180 746820
641120 746820 641120 746880 640880 746880 640880
746760 640760 746760
640760 746640 640880 746640 640880 746520 641000
746520 641000 746340
640820 746340 640820 746460 640700 746460 640700
746580 640460 746580
640460 746220;
```

ARRAY OF POLYGONS AFTER COMPRESSION

```
P635780746220&[600[300&&[180]60&&[180[180&&]60[240&&
[240[540&&]240]240&&
]180[60&&]60[60&&]120]120&&[60]60&&[60]240&&]120]120
&&]120[120&&]120[120&&]180]180&&[120]120&&[120]240|
P{1440?
P+
P{1560?
```

Although the foregoing has described the principles, preferred embodiments and modes of operation of the present invention that result in substantial data compression, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A process for compressing data relating to polygonal shapes within layouts of integrated circuits with the source and uncompressed data being functionally identical, comprising the steps of:

receiving input data in the format of polygonal shapes; and assigning unique tokens to describe selected geometrical attributes of successive identical sets of irregular polygonal shapes, which tokens ordinarily serve to compress the data by expressing geometrical distance relationships between identical polygonal shapes within a given set and, ordinarily, are less than a single byte of binary information and less than all of the vertices in the polygonal shapes, wherein the assigning step and, therefore, data compression step is accomplished based upon other polygonal shapes within the set.

2. A process according to claim 1 wherein a token is used to signify that the x-direction coordinates of a second polygon are all spaced from respective ones of the x-direction coordinates of a first polygon by a predetermined distance.

3. A process according to claim 2 wherein the same token is used to signify that the y-direction coordinates of the second polygon are equal to respective ones of the y-direction coordinates of the first polygon.

4. A process according to claim 1 further wherein, if there is constant x-direction displacement between corresponding ones of the vertices of a second polygon and the vertices of a first polygon, the location and shape of a third polygon relative to the second polygon is described by a single token.

5. A process according to claim 4 further wherein the location and shape of the third polygon is described without explicitly designating the distance that separates its vertices from respective ones of the vertices of the second polygon.

6. A process according to claim 1 further comprising the steps of introducing token values in the sets of numbers that represent the vertices of polygons for eliminating redundancy.

7. A process according to claim 1 further comprising the step of describing relative distances between vertices of polygonal shapes in integrated circuit layouts rather than the distances between the vertices and a common origin point.

* * * * *